United States Patent Office 2,923,004
Patented Jan. 26, 1960

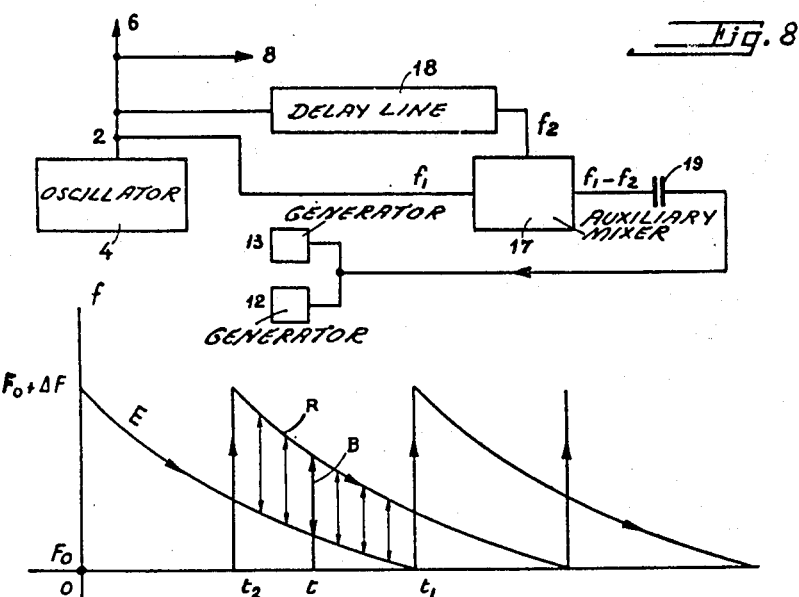
Fig. 8
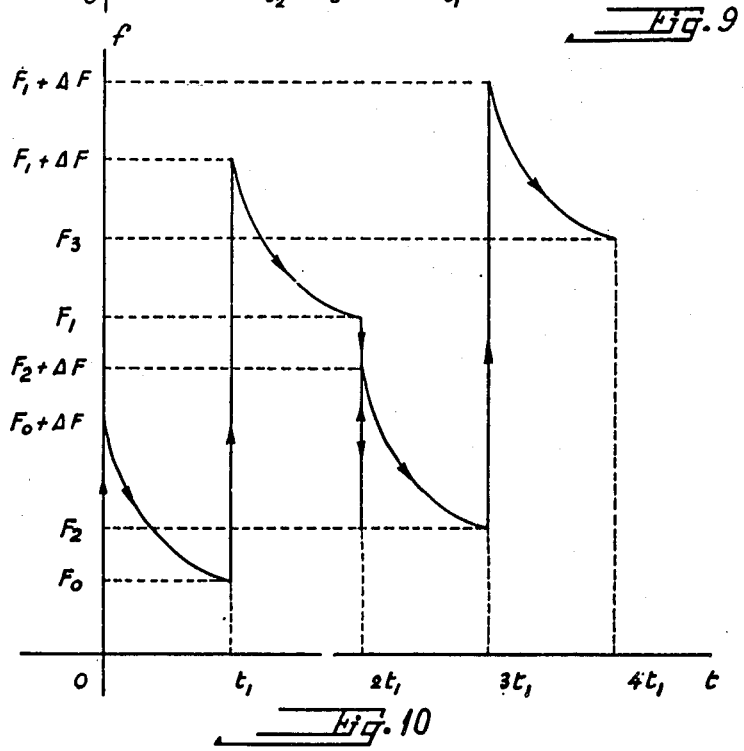
Fig. 9
Fig. 10

2,923,004
ELECTROMAGNETIC FREQUENCY MODULATED DETECTION SYSTEMS

Robert Warnecke and Oscar Döhler, Paris, France, assignors to Compagnie Generale de Telegraphie Sans Fil, a corporation of France Application December 7, 1953, Serial No. 396,619

Claims priority, application France December 8, 1952

15 Claims. (Cl. 343—14)

It is known that mobile or stationary obstacles may be detected by means of reflected ultrashort electromagnetic waves radiated by frequency or pulse modulated radar systems. It is also known that the range of these two types of radar systems is about the same when the mean value of the radiated ultrahigh frequency energy is the same.

To obtain long-range detection it is therefore necessary to use transmitter tubes which are capable of providing high mean power. It is known that in the case of pulse modulated systems this leads to very high peak powers, for example of the order of a megawatt and more when the operational frequency is of the order of 3,000 mc./sec. Thus there arise in the design of these systems complications and difficulties related to the high voltages it is necessary to apply to the tubes and to the high electric fields which must prevail in the systems transmitting ultrahigh-frequency energy, such as wave guides, rotary joints, etc. Consequently, and for other reasons known to those skilled in the art, frequency modulated systems possess, in so far as electromagnetic detection is concerned, notable advantages over pulse modulated systems.

It is known that in these systems a frequency-modulated oscillator feeds a transmitting antenna. A receiving antenna receives the wave reflected by the obstacle. The received wave is fed to a mixer which also receives the emitted wave directly from the transmitter. The frequency resulting from the mixture of these frequencies is measured after having passed through an amplifier and a limiter. Its magnitude is a function of the distance between the obstacle and the transmitter.

Conventional frequency modulated radars use a relatively small frequency deviation, for example of the order of 1 to 20 mc./sec. if they operate on a frequency of the order of 3,000 mc./sec. Accordingly, they may be provided with any known type of microwave generator. On the other hand, these radars have the disadvantage of being sensitive to interference from or jamming by any other oscillator which operates in the same narrow frequency band.

The frequency modulated radar system, according to the invention does not have this disadvantage. This radar system comprises a wide-band oscillator subject to a double frequency modulation. One of these modulations has a small frequency deviation and is used to measure the distance, as in known systems, and the other has a much greater frequency deviation and is used to displace the frequency of the transmitted wave i.e. the carrier frequency over a very wide band. For it to be possible for an interfering or jamming transmitter to cover the whole of this band, it must have itself a very wide frequency band and emit over the whole of this band with considerable power. The latter is several times greater than that necessary, for the same jamming, with narrow-band generators.

According to a preferred embodiment of the invention, the frequency of the transmitted wave is varied in a discontinuous manner while retaining constant values during finite periods. The passage from one frequency to another occurs within a very short period of time.

The apparatus according to the invention requires a generator which is capable of covering a particularly wide frequency band without an appreciable variation in power. A generator satisfying these requirements is constituted by the oscillator described in the copending U.S. patent application No. 281,347 filed on April 9, 1952, for "Backward Traveling Wave Oscillators" which matured into U.S. Patent No. 2,880,355 and in "Comptes Rendus de l'Académie des Sciences," vol. 235, pages 236–238.

The invention will be better understood from the following description taken with reference to the diagrammatic drawings showing by way of non-limitative examples some ways of carrying out the invention and in which:

Fig. 8 shows a device adapted to linearize the frequency-applied voltage curve of the oscillator utilized in a radar system according to the invention;

Fig. 9 shows a curve related to the operation of a radar system according to the invention;

Fig. 10 shows a curve related to the displacement of the carrier frequency;

Figure 1:
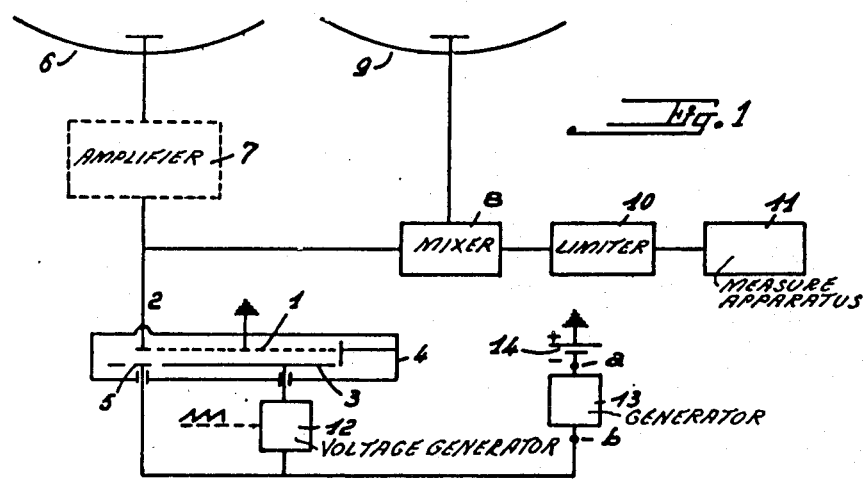
Fig. 1 shows a radar system according to the invention.

According to the embodiment diagrammatically shown in Fig. 1, the radar according to the invention comprises an oscillator described in the above-mentioned copending patent application. As is known, the main components of such an oscillator comprise a delay line 1, an output 2, a negative electrode 3 and an emitting cathode 5, housed in an envelope 4. With this type of backward wave oscillator, the tube must be placed in a magnetic field which is perpendicular to the plane of the figure. The output 2 of the tube is connected to a transmitting antenna 6, if need be through a wide-band power amplifier shown in dotted lines at 7, for example a traveling wave amplifier which may be of the crossed electric and magnetic fields type. Further, the output 2 feeds a mixer 8 which also receives the reflected signal from the obstacle, or target, by a receiver antenna 9. The output voltage of the mixer passes through an amplifier-limiter 10 and its frequency, which is measured at 11, serves to determine the distance between the obstacle and the radar.

The voltage whose variations provide the small frequency deviation modulation of the carrier wave, which modulation is used for measuring the distance between the radar system and the target, is applied between electrodes 3 and 5 by a voltage generator 12. This voltage is for example of saw-tooth, linear or exponential shape, and its amplitude is of the order of 100 to 500 v. The voltage which is used is applied by a generator 13, whose nature will be described hereunder, between the points $a$ and $b$, respectively connected to delay line 1 through the earth and if need be through a polarizing source 14 and to cathode 5. The carrier frequency displacing or slow modulation voltage may be of the order of 1,000 to 3,000 v. The frequency deviation corresponding to the distance measuring frequency modulation may for example be of the order of 100 kc. and the frequency deviation corresponding to the carrier frequency displacement may be, for example, comprised between 500 and 1000 mc. for a mean frequency of some 3000 mc.

Figure 2:
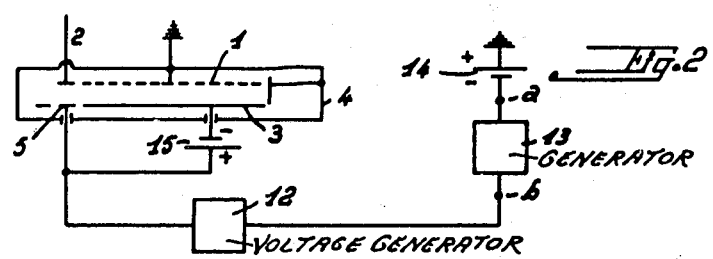
Figs. 2 and 3 show two embodiments of the modulating device.
Figure 3:
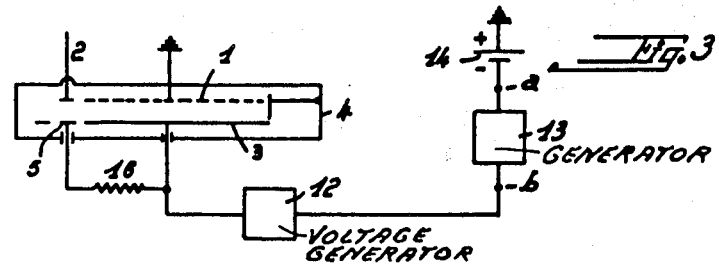

Figs. 2 and 3 are diagrammatic illustrations of two embodiments of the modulator according to the invention. In Fig. 2 the two modulation generators 12 and 13 are connected in series between delay line 1 and cathode 5, the negative potential of electrode 3 being provided by a source 15. In Fig. 3 generators 12 and 13 are connected in series between delay line 1 and electrode 3, the polarization of the latter relative to the cathode 5 being produced by a current flowing through a resistance 16.

Figure 4:
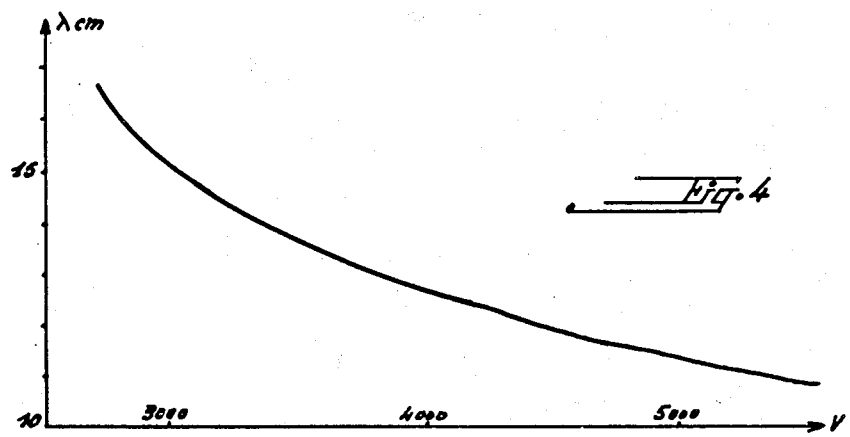
Figs. 4 to 7 show curves related to the operation of the oscillator utilized.
Figure 5:
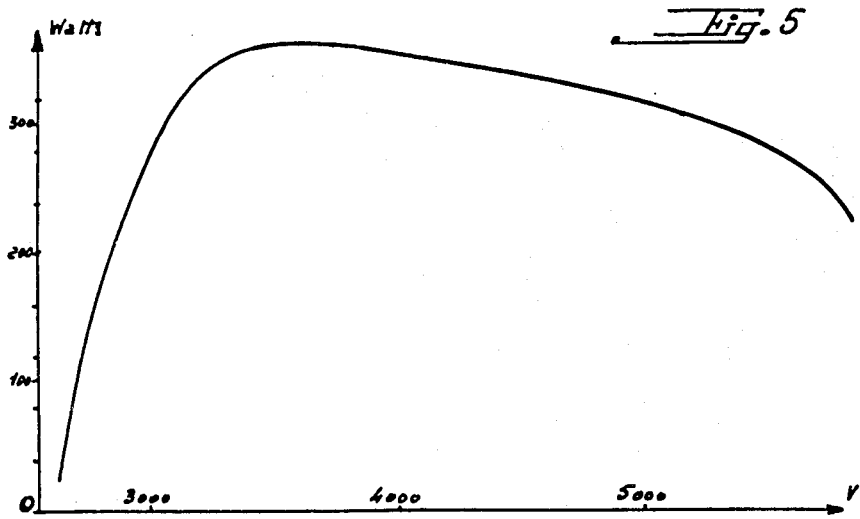

The characteristics of a specific backward wave oscillator tube will illustrate the advantages of the above described use thereof. In particular, the wave length vs. voltage characteristic shown in (Fig. 4) is substantially hyperbolic between 2,800 and 5,600 v. Hence the frequency vs. voltage characteristic has substantially the form of a straight line for the whole range of electronic tuning (curve a, Fig. 6). Furthermore, the power vs. voltage curve (Fig. 5) has, after a rapid rise, a slight constant slope over a wide voltage range, extending, for the tube in question, between 3,200 and 5,200 v.

Figure 7:
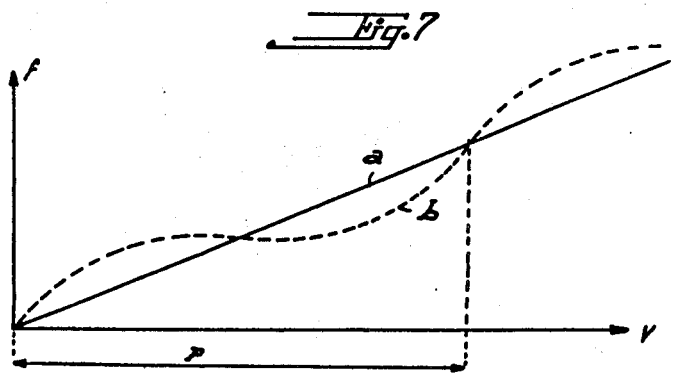
Figure 6:
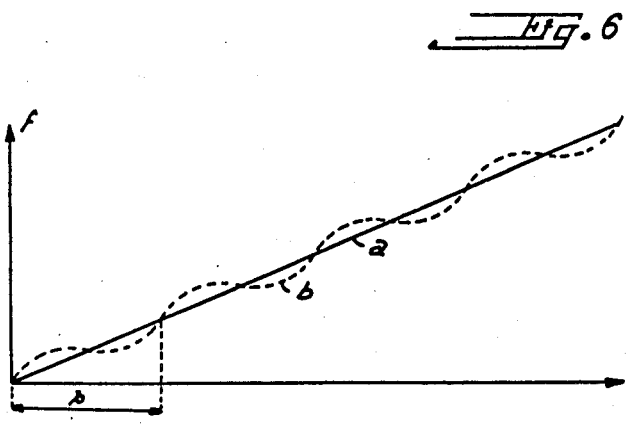

If it is not possible to obtain a sufficient matching for the whole of the band, it may happen that the frequency vs. voltage characteristic, instead of being rectilinear, is more or less undulatory (curve b, Fig. 6). These undulations are due to the presence of standing waves along the delay circuit. In this case, it is possible to improve the linearity by using a relatively short delay line i.e. a line which is short relative to the undulation period $p$ (Fig. 7). Another means for rendering the characteristic linear consists in providing the oscillator with interdigital or similar delay lines made of a slightly attenuating material. The efficiency of the circuit is thereby decreased but the reflexions which cause the standing waves are considerably reduced.

It is also possible to linearize the frequency vs. voltage characteristic by means of the assembly shown in Fig. 8. This assembly comprises an auxiliary mixer 17 to which the voltage provided by oscillator 4, whose instantaneous frequency is $f_1$ and, the same voltage delayed by a delay line 18 are simultaneously applied. This latter voltage has an instantaneous frequency $f_2$. If the voltage vs. frequency characteristic of oscillator 4 is linear, the beat of the frequencies $f_1$ and $f_2$, provided at the output of the mixer 17, is constant and the current through capacitor 19 is constant, the latter retaining a constant impedance. If there is a lack of linearity, the difference $f_1-f_2$ varies, and the current through the capacitor 19 varies as a function of the variations of the impedance of this capacitor. This current may be used for creating a negative feedback on the voltages of the sources 12 and/or 13, or for correcting the sweep of the cathode-ray tube (not shown in the drawing) which is used as indicator in the measuring system considered, according to the usual practice.

In Fig. 9 there is shown at E, the curve of the frequency modulation of a frequency modulated radar, this curve being exponential in this illustration. In this kind of radar a frequency modulation, having a maximum deviation of $\Delta F$ and a period $t_1$, is applied to the carrier frequency $F_0$. In Fig. 9 it is seen (curve E) that the instantaneous frequency of the signal emitted which is equal to $F_0$ at a time $t_0$, passes from $F_0$ to $F_0+\Delta F$ over a very short period of time which will be considered negligible compared with the period $t_1$; the instantaneous frequency thereafter decreases from the time $t_0$ to the time $t_0+t_1$ from $F_0+\Delta F$ to $F_0$, the rate of decrease following an exponential law in the example shown.

In Fig. 9 the curve R designates the curve of the modulation of the reflected wave, which is received by the antenna 9. This curve is identical to the curve E but is out of phase relative to the latter by time $t_2$; $t_2$ is given by the expression $$t_2 = \frac{2d}{c}$$

$d$ being the distance between the obstacle and the receiver, and $c$ the velocity of light.

Mixer 8 produces a variable instantaneous beat frequency whose frequency at time $t$ is shown at B (Fig. 9). This frequency is, as is well known, used to measure the distance between the transmitter and the target which reflects the signal. Experience shows that, for this measure to be sufficiently precise, it is necessary that during the period $t_1$ the carrier frequency $F_0$ vary only to a negligible extent, the relative variation being at the most of the order of 1%. Thus, it is necessary that the frequency variation impressed upon the carrier frequency by generator 12 satisfy this condition.

According to a preferred embodiment, the invention provides means whereby the carrier frequency may be displaced in a discontinuous manner. This carrier frequency will thus retain during time $\theta_0$ a value $F_0$, then suddenly jump from value $F_0$ to value $F_1$, which it will retain during a time $\theta_1$, etc. This variation may undergo a repetitive cycle, or it may be a random variation, the carrier frequency remaining, of course, between the upper and lower limits of the oscillation band of tube 4.

Fig. 10 shows an example of a variation of the carrier frequency which satisfies this condition. In this example the carrier frequency varies stepwise and all the steps occur for the same period of time which is equal to period $t_1$, of the modulation used for the distance measuring.

In the example of Fig. 10 the displacement of the carrier frequency from one level to another is always greater than the frequency deviation $\Delta F$. In other words, the relation $\Delta F < F_n - F_{n-1}$ is always retained where $F_{n-1}$ and $F_n$ are the carrier frequencies of two successive steps.

The instantaneous emitting frequency passes, starting from $F_0+\Delta F$ at time 0, to $F_0$ at time $t_1$; abruptly assumes the value $F_1+\Delta F$; drops to $F_1$ at time $2t_1$; abruptly assumes the value $F_2$, etc. It should be mentioned that, due to the fact that the carrier frequency remains constant during each period of the distance measuring modulation, the accuracy of the measurements and the range of the radar are not affected. This result may also be obtained by giving the steps a duration which is an integer multiple of the duration of one modulation period. Further, an interfering transmitter which operates in the band comprised between $F_0$ and $F_0+\Delta F$, will affect the measurement only during the time comprised between 0 and $t_1$. To carry out a constant interference it will be necessary for an interfering transmitter to cover constantly the band $F_m-F_M$, $F_m$ and $F_M$ respectively being the upper and lower limits of the carrier frequency. It must therefore constantly radiate its energy over a very wide frequency spectrum and must be in consequence much more powerful than the radar transmitter, which radiates its energy only in a narrow frequency band $F_n-F_{n-1}+\Delta F$.

Figure 11:
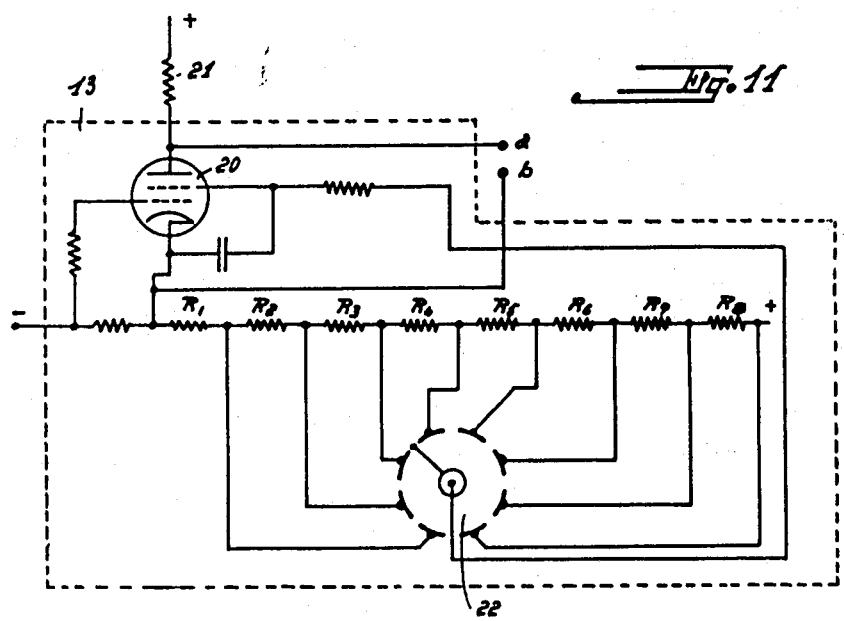
Figs. 11 and 12 show two embodiments of a device adapted to displace the carrier frequency.

Fig. 11 shows an embodiment of generator 13 shown in Fig. 1, which is capable of providing a voltage which, applied to tube 4, enables the frequency to be displaced as indicated in Fig. 10. A multigrid tube 20, loaded by a resistance 21, supplies a current which remains constant as long as its screen-grid voltage remains constant. The same is true for the voltage provided between the terminals $a$ and $b$, corresponding to the terminals $a$ and $b$ shown in Figs. 1 to 3. In the screen-grid circuit are introduced through the medium of a rotary switch 22, resistances $R_1$ to $R_8$. According to the position of the switch, a resistance of a different value is introduced in the screen-grid circuit of the tube 20. Accordingly, the output voltage of the tube varies by steps, the respective amplitudes of which depend on the values of resistances $R_1$ to $R_8$. The latter are interchangeable, i.e., the steps may be varied according to a suitable code. The mechanical switch 22 may of course be replaced by any equivalent electronic means.

This rotary switch rotates at such speed that each resistance $R_1$ to $R_8$ is introduced in the circuit for a period of time $t_1$.

This device has been described merely by way of example. Thus the duration of the steps is not necessarily equal to $t_1$, or to a multiple of $t_1$, and all the steps are not necessarily of the same duration. However, it should be mentioned that steps having a duration less than $t_1$ would limit the range of the radar. Indeed, if the first step shown in Fig. 10 is given a duration $t_3$, which is less than $t_1$, the measurement of the distance would be effected only over a period of time less than $t_3$ and the range of the radar will be less.

Figure 12:
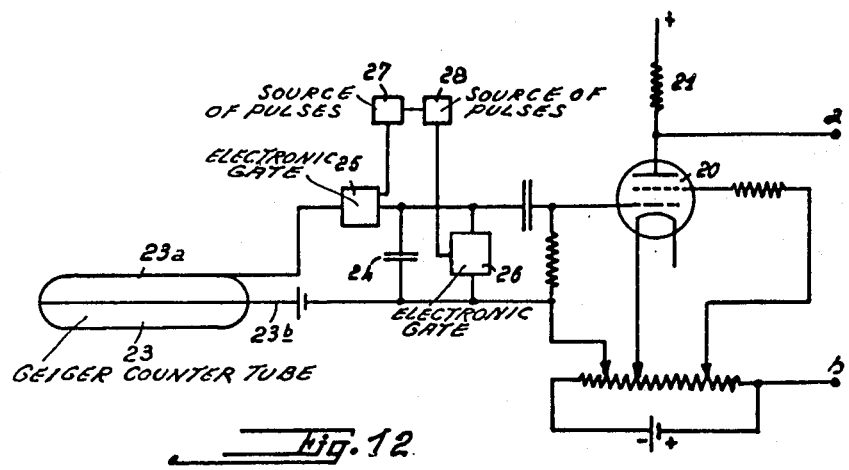

For better protecting a radar according to the invention against any danger of interference, it can be arranged that the variation of the carrier frequency of Fig. 10 is not effected according to periodically repeating steps, so that the amplitudes of the voltages applied to the screen-grid of the tube 20 do not follow any law of recurrence, but succeed each other at random. Fig. 12 shows a generator which enables this to be obtained.

This device comprises a Geiger counter tube 23 connected to a D.C. voltage source $23_0$ in such manner that this tube enters into operation under the action of any suitable radiations, for example cosmic radiations. This tube charges a capacitor 24, connected between envelope $23_a$ of the tube and its central wire $23_b$. Between envelope $23_a$ and capacitor 24 is inserted a gate 25, constituted for example by a thyratron, which is rendered conductive at periodic intervals, for example by a source 27 which periodically emits pulses. Connected in parallel with capacitor 24, is a second gate, for example a second thyratron 26. The latter is rendered conductive at periodic intervals by pulses synchronized with those of source 27. The positive plate of the capacitor 24 is directly connected to the screen-grid of a tube 20, which is similar to that shown in Fig. 11.

The system operates in the following manner:

The Geiger counter tube charges capacitor 24 to a certain voltage during a period of time corresponding to one pulse emitted by source 27. This voltage is, firstly, function of the number of cosmic particles that have passed through the tube in the period of time between two pulses from source 27, which is preferably a multiple of $t_1$. This number does not depend on any law. This voltage is also proportional to the duration of each pulse from source 27, which is constant. The screen-grid of tube 20 thus has a random bias. This bias governs, as in the case of the apparatus shown in Fig. 11, the amplitude of the voltage between the terminals $a$ and $b$, that is, the height of the first step.

After the period of time, which determines the duration of the step, source 28 provides in turn a pulse which renders thyratron 26 conductive. Capacitor 24 discharges through tube 26. If sources 27 and 28 are synchronized, source 27 will produce at the same moment a further pulse which will render tube 25 conductive. Capacitor 26 is then recharged to the random voltage produced by tube 23. This voltage will determine the height of the next step.

The time constants are chosen such that the time necessary to charge capacitor 24 should be small relative to the duration of the steps and the time necessary for its discharging be long as compared to the same duration. It is preferable that the device shown in Fig. 12 be used only if the radiations are sufficiently strong for shifting by at least ΔF the level of one step from that of the preceding step.

As an illustration of the advantages of the invention, it may be mentioned that in an experimental tube of the above-mentioned type it was possible to cover on either side of 3,000 mc./sec. an electronic tuning band of 1,000 mc./sec. with an output constant within 3 db. This output power for a permanent operation was of the order of 1 kw. with a total efficiency of about 50%.

It is obvious that the invention is applicable to any type of frequency modulation radar systems, for example to linear saw tooth modulation radar systems.

What we claim is:

1. A frequency modulated radar comprising: a backward wave oscillator tube including a cathode for emitting an electron beam, an output and electrode means for velocity modulating said beam; first voltage means coupled to said electrode means for velocity modulating said electron beam within first limits, thereby to vary the oscillation frequency of said tube with a first frequency swing; and second voltage means, simultaneously coupled to said electrode means, for velocity modulating said beam within second limits, thereby to vary said oscillation frequency with a second frequency swing.

2. A frequency modulated radar comprising: a travelling wave tube oscillator including: an electron emitting cathode; a delay line; an output and a negative electrode; a transmitting antenna connected to said output; a receiver antenna adapted to receive signals transmitted by said transmitting antenna and reflected by a target; a mixer connected both to said receiver antenna and to said output; first means for frequency modulating the output signal of said oscillator with a first predetermined repetition frequency and a predetermined frequency deviation; and second means for simultaneously varying the frequency of said output signal of said oscillator at the end of predetermined recurrence periods of said first frequency by an amount at least equal to said deviation, said first and second means being series connected between said delay line and said negative electrode.

3. A frequency modulated radar comprising: a travelling wave tube oscillator including: an electron emitting cathode; a delay line; an output and a negative electrode; a transmitting antenna connected to said output; a receiver antenna adapted to receive signals transmitted by said transmitting antenna and reflected by a target; a mixer connected both to said receiver antenna and to said output; first means for frequency modulating the output signal of said oscillator with a predetermined repetition frequency and a predetermined deviation and second means for simultaneously varying the frequency of said output signal of said oscillator at the end of predetermined recurrence periods of said first frequency by an amount at least equal to said deviation, said first and second means being series connected between said delay line and said negative electrode, and further means connected between said negative electrode and said cathode for conveniently polarizing said cathode with respect to said negative electrode.

4. A frequency modulated radar comprising: a travelling wave tube oscillator including: an electron emitting cathode; a delay line; an output and a negative electrode; a transmitting antenna connected to said output; a receiver antenna; a mixer connected both to said receiver antenna and to said output; first means for first varying the velocity of the electrons emitted by said cathode, thereby to vary the frequency of oscillations of said tube throughout a wide band; second means independent of said first means and simultaneous therewith for periodically varying the velocity of said electrons within narrower limits with respect to said first variation, thereby to modulate the said frequency of oscillations at selected frequencies within narrow bands contained in said band, said first and second means being series connected between said delay line and said negative electrode, and further means connected between said negative electrode and said cathode for conveniently polarizing said cathode with respect to said negative cathode.

5. A frequency modulated radar comprising: a travelling wave tube oscillator including: an electron emitting cathode; a delay line; an output and a negative electrode; a transmitting antenna connected to said output for emitting a frequency modulated carrier wave; a receiver antenna adapted to receive signals transmitted by said transmitting antenna and reflected by a target; a mixer connected both to said receiver antenna and to said output; a first source of recurrent voltage having a predetermined voltage swing for velocity modulating the electron beam of said oscillator; a second source of voltage for velocity modulating said electron beam, said voltage of said second source being variable in time at such a rate that it remains substantially constant during each of the periods of said recurrent modulation, and that, at the end of some predetermined periods, selected between said periods, it jumps from one value to another value different from the preceding by an amount at least equal to said swing; said first and second source being series connected between said delay line and said negative electrode, and means connected between said negative electrode and said cathode for conveniently polarizing said cathode with respect to said negative electrode.

6. A frequency modulated radar, as claimed in claim 5, further comprising: an auxiliary mixer having a first and a second input and one output, said first input being connected to said output of said oscillator; a further delay line, said second input being connected to said output of said oscillator through said further delay line; a capacitor series connected between the output of said auxiliary mixer and said first and said second source of voltage.

7. A radar according to claim 5, wherein said second voltage is periodically variable.

8. A radar according to claim 5, wherein said second voltage is variable at random.

9. A frequency modulated radar comprising: a travelling wave tube oscillator including: an electron emitting cathode; a delay line; an output and a negative electrode; a transmitting antenna connected to said output; a receiver antenna adapted to receive signals transmitted by said transmitting antenna and reflected by a target; a mixer connected both to said receiver antenna and to said output; a first source of recurrent voltage having a predetermined voltage swing for velocity modulating the electron beam of said oscillator; a second source of voltage for velocity modulating said electron beam and means to vary said voltage by steps in coincidence with said recurrent voltage periods, whereby said carrier frequency is varied by a step at the end of some of said periods, said first and second source being series connected between said delay line and said negative electrode, and means connected between said negative electrode and said cathode for conveniently polarizing said cathode with respect to said negative electrode.

10. A radar according to claim 9, wherein each of said steps has a duration equal to $n$ periods of said recurrent frequency modulation, $n$ being integer.

11. A radar according to claim 9, wherein said steps are recurrently repeated.

12. A radar according to claim 9, wherein said steps are of the random type.

13. A frequency modulated radar comprising: a travelling wave tube oscillator including: an electron emitting cathode; a delay line; an output and a negative electrode; a transmitting antenna connected to said output; a receiver antenna adapted to receive signals transmitted by said transmitting antenna and reflected by a target; a mixer connected both to said receiver antenna and to said output; a first source of recurrent voltage having a predetermined voltage amplitude for providing a first velocity modulation of the electron beam of said oscillator, and a second simultaneously operating source of recurrent voltage having an amplitude substantially higher and a recurrence period substantially longer than the amplitude and the period of the voltage delivered by said first source respectively for providing a second velocity modulation of the electron beam of said oscillator within substantially broader limits than those of said first velocity modulation, said first and second source being series connected between said delay line and said negative electrode, and means connected between said negative electrode and said cathode for conveniently polarizing said cathode with respect to said negative electrode.

14. In a frequency modulated radar of the type comprising a transmitter for emitting a frequency modulated carrier wave and a receiver adapted to receive signals transmitted by said transmitter and reflected by a target: in said transmitter, a travelling wave oscillator tube of the type having a source for emitting an electron beam the velocity of the electrons of which may be varied by applying a voltage applied to said tube whereby the frequency of the wave transmitted by said source is modulated; a first source of recurrent voltage for providing a frequency modulation of said carrier wave; a second source of voltage to provide a displacement of said carrier wave at least equal to the frequency swing of said frequency modulation, said voltage being variable by steps in coincidence with said recurrent voltage periods, whereby said carrier frequency is varied by a step at the end of some of said periods, said second source comprising an electronic tube comprising a cathode, an anode, a screen grid and a control grid, a load series connected to said anode, a variable resistor having first and second terminals respectively connected to said screen and control grids, a switch for inserting portions of said resistor between said terminals in preselected succession, and means for recurrently actuating said switch.

15. In a frequency modulated radar of the type comprising a transmitter for emitting a frequency modulated carrier wave and a receiver adapted to receive signals transmitted by said transmitter and reflected by a target; in said transmitter, a travelling wave oscillator tube of the type having a source for emitting an electron beam, the velocity of the electrons of which may be modulated by applying a voltage to said tube whereby the frequency of the wave transmitted by said source is varied; a first source of recurrent voltage to provide a frequency modulation of said carrier wave; a second source of voltage to provide a frequency shift of said carrier wave at least equal to the frequency swing of said frequency modulation, said voltage varying by steps in coincidence with said recurrent voltage periods, whereby said carrier frequency is varied by a step at the end of some of said periods, said second source comprising an electronic tube comprising a cathode, an anode, a screen grid and a control grid and a load series connected to said anode, a condenser having two armatures inserted between said cathode and said screen grid, a Geiger tube having two armatures, a first electronic switch series connected between one of said armatures of said Geiger tube and one of said armatures of said condenser, a source of the voltage series connected between the other armature of Geiger tube and the other armature of said condenser, a first source of periodic pulses operatively connected to said switch, a second electronic switch parallel connected with said condenser, a second source of periodic pulses operatively connected to said second switch and means to synchronize said first and said second sources of periodic pulses.

References Cited in the file of this patent

UNITED STATES PATENTS

| | | |
|---|---|---|
| 2,344,679 | Crosby | Mar. 21, 1944 |
| 2,505,692 | Staal et al. | Apr. 25, 1950 |
| 2,707,233 | Norton | Apr. 26, 1955 |

FOREIGN PATENTS

| | | |
|---|---|---|
| 673,033 | Great Britain | May 28, 1952 |